United States Patent [19]

Furuta et al.

[11] Patent Number: 4,944,962

[45] Date of Patent: Jul. 31, 1990

[54] METHOD FOR DIRTPROOFING TREATMENT FOR PLASTIC LENS

[75] Inventors: Shoichiro Furuta, Aza-Gohigashi; Hirohisa Kato, Aichi; Hirohito Seto, Anjo, all of Japan

[73] Assignee: Ito Optical Industrial Co., Ltd., Gamagori, Japan

[21] Appl. No.: 363,903

[22] PCT Filed: Oct. 24, 1988

[86] PCT No.: PCT/JP88/01079

§ 371 Date: May 17, 1989

§ 102(e) Date: May 17, 1989

[87] PCT Pub. No.: WO89/04005

PCT Pub. Date: May 5, 1989

[51] Int. Cl.$^5$ .................................. B05D 3/02
[52] U.S. Cl. ........................... 427/164; 427/335; 427/384; 427/430.1
[58] Field of Search .............. 427/164, 335, 430.1, 427/384

[56] References Cited

U.S. PATENT DOCUMENTS 4,096,315  6/1978  Kubacki .
4,338,375  7/1982  Hashimoto et al. ............... 427/164
4,374,158  2/1983  Taniguchi et al. ................ 427/164
4,382,983  5/1983  Yuyama et al. .................... 427/164
4,769,259  9/1988  Ueno ................................ 427/164

FOREIGN PATENT DOCUMENTS 58-211701  12/1983  Japan .
59-13202   1/1984   Japan .
61-18901   1/1986   Japan .

Primary Examiner—Janyce Bell
Attorney, Agent, or Firm—Armstrong, Nikaido, Marmelstein, Kubovcik & Murray

[57] ABSTRACT

A method is disclosed which concerns the treatment for imparting dirtproofness to a plastic lens provided in advance on the surface thereof with an antireflection film formed by vacuum evaporation of an inorganic substance. This method forms a dirtproofing film on the antireflection film by mixing a polyfluoroalkyl silane-containing coating liquid and trichlorotrifluoroethane and boiling the resultant mixture, dip coating the plastic lens in the boiled mixture, then treating the dip coated plastic lens with the vapor of fluoroethane, subsequently drying the wet plastic lens with hot air, and optionally immersing the dried plastic lens in water.

3 Claims, 1 Drawing Sheet

METHOD FOR DIRTPROOFING TREATMENT FOR PLASTIC LENS

TECHNICAL FIELD

This invention relates method of treatment for imparting a dirtproofing property (inclusive of waterproofing property and oilproofing property) to a plastic lens having a film of an inorganic substance deposited by vacuum evaporation on the surface of a substrate. It is particularly advantageous for application to an eyeglass.

BACKGROUND ART

In the substrates for plastic lenses, particularly transparent substrates reflect beams of light from the sun or the illumination and suffer from loss of transmittance of light. Owing to this loss of transmittance, a light passed through a lens loses in brightness. The reflection of light produces a reflected image called a ghost on the lens surface and imparts an unpleasant feeling to the eyes of the person wearing the lens. In the plastic substrates, the eyeglass lens is deficient in surface hardness and liable to sustain scratches. For the alleviation of the impacts of these drawbacks, the practice of coating the eyeglass lens with a film, particularly an antireflection film, of an organic substance by vacuum evaporation is in vogue.

When the antireflection film is covered with electrostatically deposited dirt and dust or with physically deposited filth, fingerprints, and perspiration from hands, it is misted possibly to the extent of obstructing the vision of the person wearing the eyeglass and compelling the person to experience an unpleasant feeling. In the circumstances, wiping cloth and paper and detergents useful for temporary removal of dirt are offered in the market. Methods for imparting a dirtproofing property to the antireflection film by applying a substance containing an organic silicon compounds on the film have been disclosed in Japanese Patent Application Disclosures SHO 61(1981)-130,902, SHO 51(1976)-1,387, and SHO 50(1975)-10,440, for example. The conventional methods effect the surface treatment by employing the dip coating method and attain the drying of a wet applied layer by allowing the wet layer to stand overnight at normal room temperature or to stand for not less than 20 minutes at a temperature of about 100° C. Thus, they invariably require the wet applied layer to be dried by standing either for a long time or at an elevated temperature.

The conventional dirtproofing treatment of a lens resorting to the dip coating method has a disadvantage that the film formed by vacuum evaporation is liable to sustain cracks in the surface, through which the lens suffer from impairment of its appearance, because the wet applied film has to be dried by a protracted standing at an elevated temperature approximately in the range of 50° C. to 70° C. or by a brief standing at higher temperature approximately in the range of 70° C. to 100° C. The protracted standing for the purpose of drying is nothing desirable from the standpoint of productivity.

The dip coating method is popularly used for the treatment under discussion. The conventional dip coating method has a disadvantage that the applied liquid layer tends to leave a mark of drawdown on the lens surface and form a dry layer of uneven wall thickness. If the drawdown blurs the lens surface, the mark of blur stands out and spoils the appearance of the lens.

The polyfluoroalkyl silane which is used as an organic silicon comound for the dirtproofing treatment is so expensive that generous use of this compound is undesirable from the standpoint of cost.

DISCLOSURE OF INVENTION

The inventors studied the problem mentioned above from various angles and continued a diligent study in search of a method of treatment for impartation of dirtproofness and scratchproofness to the film deposited by vacuum evaporation. They has consequently conceived the following general idea about a method for the dirtproofing treatment of a plastic lens.

To be specific, this invention concerns a method for the impartation of dirtproofness to a plastic lens provided with an antireflection film deposited by vacuum evaporation. This method is characterized by the steps of mixing a polyfluoroalkyl silanecontaining coating liquid with trichlorofluoroethane, boiling the resultant mixture, dip coating a given plastic lens with the boiled liquid, then treating the coated plastic film with the vapor of trichlorotrifluoroethane, subsequently drying the wet plastic lens with hot air, and optionally cleaning the dried plastic lens by immersion in water thereby giving rise to a dirtproofing film on the antireflection film.

The method of this invention for the dirtproofing treatment of a plastic lens permits removal of a mark possibly left on an eyeglass lens by the suction plate to be used during the grinding work. The lens treated by this method enjoys good appearance unlike the plastic lens treated by the conventional method because it does not allow a mark of the suction plate, a mark of drawdown inflicted during the course of dip coating, or a mark of stain due to lack of uniformity of applied layer to stand out when the lens surface is misted. Moreover, this lens does not permit ready adhesion of such defiling matter as fingerprints and filth from hands but permits ready removal of dirt with dry cloth or paper. Unlike the lens yet to be treated, the lens treated by the method of this invention defies opacification with the grease of fingerprints, for example, keeps transparency intact. It ruther enjoys satisfactory slidability of surface and, therefore, offers resistance to infliction of scratches. It has an ability to repel water and oil and keep its surface free from raindrops on a rainy day. By the test for weatherability, the treates lens has been confirmed to retain the desirable effects mentioned above for a long time. The method of this invention produces these desirable effects on the plastic lens by a treatment to be given at a low temperature approximately in the range of 40° C. to 60° C. for a short period on the order of 10 minutes. Thus, the method enjoys high productivity.

BEST MODE FOR CARRYING OUT THE INVENTION

Figure 1:
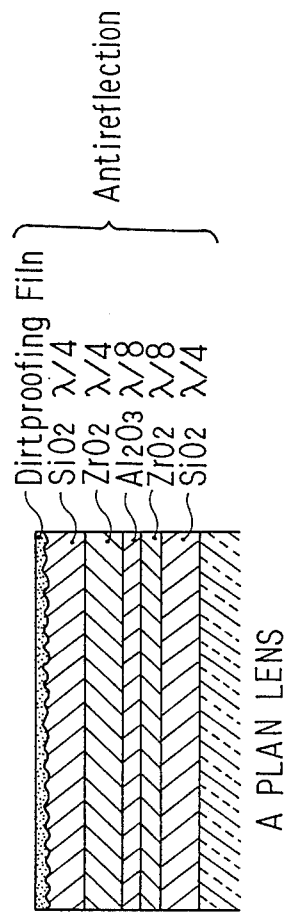
FIG. 1 is a diagram illustrating in model the relation of component layers of a plastic lens after the dirtproofing treatment.

As typical examples of the polyfluoroalkyl silane to be used in the present invention, the following compounds may be cited.

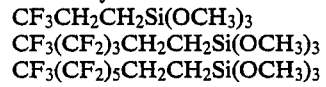

$CF_3(CF_2)_7CH_2CH_2Si(OCH_3)_3$
$CF_3CH_2CH_2Si(OC_2H_6)_3$
$CF_3(CF_2)_3CH_2CH_2Si(OC_2H_5)_3$
$CF_3(CF_2)_5CH_2CH_2Si(OC_2H_5)_3$
$CF_3(CF_2)_7CH_2CH_2Si(OC_2H_5)_3$
$CF_3CH_2CH_2SiCl_3$
$CF_3(CF_2)_3CH_2CH_2SiCl_3$
$CF_3(CF_2)_5CH_2CH_2SiCl_3$
$CF_3(CF_2)_7CH_2CH_2SiCl_3$
$CF_3(CF_2)_5CH_2CH_2SiCH_3Cl_2$
$CF_3(CF_2)_7CH_2CH_2SiCH_3Cl_2$
$CF_3(CF_2)_5CH_2CH_2SiCH_3(OCH_3)_2$
$CF_3(CF_2)_7CH_2CH_2SiCH_3(OCH_3)_2$
$CF_3(CF_2)_5CH_2CH_2SiCH_3(OCH_5)_3$
$CF_3(CF_2)_7CH_2CH_2SiCH_3(OC_2H_5)_3$

The polyfluoroalkyl silane solution to be used herein as the treating liquid is prepared by mixing the polyfluoroalkyl silane in an amount in the range of 1 to 10 wt% with a lower alcohol as a solvent and hydrolyzing the resultant mixture. The polyfluoroalkyl silane is so expensive that ample use thereof is undesirable from the economic point of view. In the treatment by the dip coating method, since the wet applied layer is dried at a temperature not exceeding 60° C., sole use of a lower alcohol tends to entail the phenomenon of drawdown and heavy loss of the treating liquid by entrainment. To preclude this trouble, one part by weight of the polyfluoroalkyl silane solution which has undergone the hydrolysis with a lower alcohol is used as diluted in 2 to 10 parts by weight of trichlorotrifluoroethane which has a low boiling point and exhibits high solubility in the low alcohols. Typical proprietary products of trichlorotrifluoroethane are Daifron Solvent S3 (trademark designation owned by Daikin Kogyo Co., Ltd.), Fronsolve (trademark designation owned by Asahi Glass Company, Ltd.), and Freon TF (trademark designation owned by Mitsui-DuPont Fluorochemical K.K.), for example. In preparation for the treatment by the dip coating method, the diluted polyfluoroalkyl silane-containing solution is heated to and boiled at the boiling point (about 47° C.). In the boiling solution, a given substance is kept immersed for about one minute. This substrate is desired to have been deprived of such defiling matters as fingerprints and filth from hands and saliva deposited on the film of vacuum evaporation. The boiling tank to be used for the dip coating is desired to be a vapor tank provided with a condenser. The substrate immersed is dip coated in the bath. While the dip coated substrate is being lifted from the bath, it is caused to pass through the vapor of trichlorotrifluoroethane having a pressure of 1 kg/cm$^2$ abs. Thus, a uniform coating is formed on the substrate. The coated substrate is then placed in a hot air tank and dried therein under the conditions of 40° C. to 60° C.×1 to 5 minutes. If this drying is continued for a longer time or carried out at a temperature exceeding 60° C., it possibly entails a disadvantage that the film of vacuum evaporation will sustain cracks on the surface and acquire a spoiled appearance. To enhance further the effect of the dirtproofing treatment, the coated lens after the drying in hot air is immersed in water for two to five minutes. This immersion is advantageous because it is effective in removing the unaltered monomer and uniformizing the film.

If the produced film is deprived of the uniformity of wall thickness by the dirtproofing treatment, then the interference fringes and the reflection colors consequently produced will eventually impair the quality of the film of vacuum evaporation. By washing the coated lens in a dehtdrating tank, a trichlorotrifluoroethane tank, an alcohol tank, etc., the film can be finished in an extremely small and uniform wall thickness without any sacrifice of quality. It has been demonstrated as in Japanese Patent Application disclosure SHO 61(1986)-130,902, for example, that the film of a wall thickness not exceeding 100 Å has no bearing on the impact of interference fringes. Actually the surface of the film formed by vacuum evaporation is full of extremely minute rises and falls and pits. Since these surface irregularities admit the polyfluoroalkyl silane, the film is finished advantageously in an extremely small wall thickness. The polyfluoroalkyl silane thus lodged in the surface portion of the film presumably serves to smoothen the film surface enough for the finished film to exhibit highly satisfactory slipperiness.

Generally the film formed by vacuum evaporation yields its quality to the impact of aging and tends to lose in thermal stability and waterproofness with elapse of time. The treatment to be performed after the dip coating treatment, therefore, is desired to be completed within a short span of time. The film of vacuum evaporation which has been given this treatment has a surface which is not easily defiled and permits ready removal of adhering dirt and, moreover, excels in water-repellency and oil-repellency. This film has an additional advantage that the surface thereof enjoys highly satisfactory slipperiness and defies infliction of cracks. It retains dirtproofness, water-repellency, and oil-repellency intact through a protracted use. These merits warrant effective application of the invention to plastic lens and particularly an eyeglass lens.

The time required for the dirtproofing treatment by the method of this invention is roughly 10 minutes, a duration which is one half of the time required for the treatment by the conventional method. Thus, this treatment enjoys proportionately high productivity.

EXAMPLES

Now, the present invention will be described more specifically below with reference to working examples. It should be noted, however, that this invention is not restricted by these examples. Preparation of treating liquid:

In 100 parts by weight of methanol, 5 parts by weight of polyfluoroalkyl silane represented by the following structural formula:

$$CF_3(CF_2)_7CH_2CH_2Si(OCH_3)_3$$

was dissolved. The resultant solution was placed in a three-neck flask and stirred and refluxed for hydrolysis at the temperature of 82° C. for two hours. After the reflux, the hydrolyzate and 400 parts by weight of Daifron Solvent S3 (trademark designation owned by Daikin Kogyo Co., Ltd.) added thereto were toroughly stirred to produce a 1% solution of polyfluoroalkyl silane.

EXAMPLE 1

On a plane lens of CR39 (polydiethylene glycol bisallyl carbonate) 70 mm in diameter, an antireflection film was formed by sequentially superposing $SiO_2$, $ZrO_2$, $Al_2O_3$, $ZrO_2$, and $SiO_2$ in respective thicknesses of λ/4, λ/8, λ/8, λ/4, and λ/4 (λ=520 mm) (seeing FIG. 1) in the order mentioned from the lens surface side by the method of vacuum evaporation. The film assumes a reflection interference color of green. The dirtproofing treatment was carried out by boiling the treating liquid mentioned above, keeping the substrate immersed in the boiling treating liquid for one minute, and lifting the substrate at a rate of 3 m/min to complete the dip coating treatment. Since the dip coated substrate was necessarily passed through the vaper of Daifron Solvent S3 (trichlorotrifluoroethane) (1 kg/cm$^2$ abs) at 47° C., a uniform film was formed thereon without entailing the phenomenon of drawdown. The coated substrate was then dried for one minute in an atmosphere kept at 60° C. and then kept immersed in water for five minutes. As the result, the film of polyfluoroalkyl silane was solidified on the surface of the antireflection film. The substrate still wet was dehydrated, washed with Daifron Solvent S3 for removal of loose fragments from the film surface. The solid film produced in a small uniform thickness not exceeding 100 Å was finished in a Daifron solvent S3 vapor tank (1 kg/cm$^2$ abs) kept at 47° C.

Comparative Experiment 1

In the same manner as in Example 1, an antireflection film was formed on a lens of CR39. The same treating liquid was cooled to 10° C. The lens was immersed in the cooled treating liquid and lifted from the bath at a rate of 3 m/min to effect dip coating.

Comparative Experiment 2

A treating liquid was prepared by following the procedure of Example 1 up to the step of hydrolysis and omitting the subsequent step of dilution with Daifron Solvent S3. This treating liquid was cooled to 10° C. A given lens was immersed in the cooled treating liquid and then lifted from the bath at a rate of 3 m/min to effect dip coating.

When the treatment was carried out by this procedure, the treating liquid applied on the lens surface was not easily vaporized and caused the phenomenon of drawdown. Thus, no uniform coating could be obtained. Moreover, the polyfluoroalkyl silane was heavily lost by being entrained by the treated substrate.

Comparative Experiment 3

The procedure of Experiment 1 was repeated, excepting the treatment with water (five minutes immersion in water) was omitted, the hot air drying was continued for five minutes, the washing was made with Daifron Solvent S3, and the washed substrate was finished with the vapor of the solvent (1 kg/cm$^2$ abs).

Comparative Experiment 4

The procedure of Embodiment 1 was repeated, excepting the time for the hot air drying was changed to one minute.

Comparative Experiment 5

On a CR39 plane lens 70 mm in diameter, an antireflection film was formed by following the procedure of Embodiment 1. It was not subjected to the dirtproofing treatment.

The plastic lenses obtained in the embodiment and the comparative experiments described above were evaluated with respect to scratchproofness, dirtproofness, and appearance by the respective methods indicated below. The results are shown in Table 1.

(1) Scratchproofness

This property was determined by rubbing the surface of a given sample plastic lens with a 3-cm cube of steel wool (0000) held in a hand and pressed against the surface with a fixed strength determined by rating the extent of scratches inflicted by the rubbing on rhe surface and rating the scratches formed on the surface on the three-point scale, wherein A stands for infliction of slight (shallow) scratches, B for infliction of rather deep scratches, and C for infliction of heavy scratches.

(2) Dirtproofness

This property was determined by keeping a sample plastic lens in hot water at 80° C. for 10 minutes, wiping the wet lens surface with a wad impregnated with acetone, placing water drops on the cleaned lens surface, drying the lens with hot air at 60° C. for ten minutes, and then trying the dried surface of the lens to find whether or not any water mark or smear could be easily removed by rubbing. The rating was made on the three-point scale, wherein a double circle (⊚) stands for ready removal with dry cotton cloth, a single circle (○) for rather forced removal with dry cotton cloth, and a cross (×) for unsuccessful removal (water mark persisting in white around the boundary after rubbing with cotton cloth impregnated with acetone).

(3) Appearance

This property was determined by wiping the surface of a sample lens clean with a wad impregnated with acetone, fogging the cleaned lens surface with breath, observing the fogged lens surface against the light from a fluorescent lamp, and rating the mark of drawdown or other similar mark on the three-point scale, wherein X stands for absence of any discernible mark of fogging with breath, Y for presence of barely discernible mark of fogging with breath, and Z for presence of clearly discernible mark of fogging with breath.

Example 2

A plane lens of polycarbonate resin was subjected to hard coating with an organic substance. On the hard film consequently formed on the lens, a film was formed by sequentially superposing layers of SiO$_2$, ZrO$_2$, SiO$_2$, ZrO$_2$, ZrO$_2$, SiO$_2$, ZrO$_2$, and SiO$_2$, in respective thicknesses of λ/4, λ/4, λ/4, λ/4, λ/4, λ/4, and λ/2 (λ=520 mm) in the order mentioned from the lens surface side by vacuum evaporation. The lens was subjected to the same dirtproofing treatment as in Example 1. The film of vacuum evaporation possessed satisfactory slipperiness and exhibited high dirtproofness.

TABLE 1

|  | Scratchproofness | Dirtproofness | Appearance |
| --- | --- | --- | --- |
| Example 1 | A | ⊚ | X |
| Comparative Experiment 1 | A | ⊚ | Y |
| Comparative Experiment 2 | B | ○ | Z |
| Comparative Experiment 3 | A | ○ | X |
| Comparative Experiment 4 | B | X | X |
| Comparative Experiment 5 | B | X | X |

We claim:

1. A method for the impartation of dirtproofness to a plastic lens provided in advance of a film formed by vacuum evaporation, which method comprises the steps of:
   (a) mixing a polyfluoroalkyl silane-containing coating liquid and trichlorotrifluoroethane in a gravimetric ratio in the range of ½ to 1/10 and boiling the resultant mixture,
   (b) subjecting said plastic lens to a dip coating treatment in the boiled mixture, and
   (c) removing said plastic lens from said boiled mixture and dried with hot air under the conditions of 1 to 5 minutes × 40° C. to 60° C. thereby forming a dirtproofing film on said film of vacuum evaporation.

2. A method according to claim 1, which further comprises a step of immersing in water the plastic lens after said step of drying with hot air.

3. A method according to claim 1 or claim 2, wherein a hard coat is interposed between said substrate and said film of vacuum evaporation.

* * * * *